US012109671B2

(12) United States Patent
Basson et al.

(10) Patent No.: US 12,109,671 B2
(45) Date of Patent: Oct. 8, 2024

(54) MECHANICAL TENSIONING SYSTEM AND METHOD

(71) Applicant: ADvMet (Pty) Ltd, Durban (ZA)

(72) Inventors: Christian Ivan Basson, Durban (ZA); Lorenzo Andrea Missio, Durban (ZA)

(73) Assignee: ADVMET (PTY) LTD, Salt Rock (ZA)

( * ) Notice: Subject to any disclaimer, the term of this patent is extended or adjusted under 35 U.S.C. 154(b) by 463 days.

(21) Appl. No.: 17/611,329

(22) PCT Filed: May 14, 2020

(86) PCT No.: PCT/IB2020/054581
§ 371 (c)(1),
(2) Date: Nov. 15, 2021

(87) PCT Pub. No.: WO2020/230081
PCT Pub. Date: Nov. 19, 2020

(65) Prior Publication Data

US 2022/0226976 A1 Jul. 21, 2022

(30) Foreign Application Priority Data

May 16, 2019 (ZA) ................................ 2019/03053
Feb. 10, 2020 (ZA) ................................ 2020/00823

(51) Int. Cl.
*B25B 29/02* (2006.01)

(52) U.S. Cl.
CPC .................................... *B25B 29/02* (2013.01)

(58) Field of Classification Search
CPC ............................... B25B 29/02; B23P 19/067
See application file for complete search history.

(56) References Cited

U.S. PATENT DOCUMENTS 5,137,408 A * 8/1992 Junkers .................. F16B 31/04 411/222
5,318,397 A * 6/1994 Junkers .................... B25B 5/10 411/432

(Continued)

FOREIGN PATENT DOCUMENTS

DE 2020/08012922 3/2010
EP 3205452 8/2017

OTHER PUBLICATIONS

International Searching Authority, "Written Opinion of the International Searching Authority", in Application No. PCT/IB2020/054581, dated Aug. 12, 2020, 6 pages.

(Continued)

*Primary Examiner* — David B. Thomas
(74) *Attorney, Agent, or Firm* — Hickman Becker Bingham Ledesma LLP

(57) ABSTRACT

The invention relates to a removable mechanical tensioning system, tool, and a method of stretching a bolt or stud axially, the bolt being located in and attachable to an object via a nut. The system in accordance with the invention comprises an anti-rotation member; and a tensioner device. The anti-rotation member is attachable to both the tensioner device and bolt. The tensioner device is operatively attachable to the bolt via the anti-rotation member. The tensioner device comprises or is operatively coupled to a nut engaging assembly configured to automatically engage and tighten the nut, at a lower torque than the applied tool torque. Displacement of a part of the tensioner device with a holding force applied to the anti-rotation member causes axial stretch of the elongate member and actuation of the nut engaging assembly to bring about displacement of the nut in the transverse direction relative to the stretched elongate member.

17 Claims, 9 Drawing Sheets

(56) References Cited

U.S. PATENT DOCUMENTS

| | | | | |
|---|---|---|---|---|
| 5,406,867 | A * | 4/1995 | Junkers | F16B 31/04<br>81/57.38 |
| 5,538,379 | A * | 7/1996 | Junkers | F16B 31/04<br>411/917 |
| 5,539,970 | A | 7/1996 | Junkers | |
| 6,810,571 | B1 * | 11/2004 | Junkers | F16B 31/04<br>29/446 |
| 8,266,781 | B2 * | 9/2012 | Bucknell | B23P 19/067<br>411/917 |
| 9,321,161 | B2 * | 4/2016 | Ceney | B25B 13/06 |
| 10,794,416 | B2 * | 10/2020 | Komatsu | B25B 29/02 |
| 10,828,759 | B2 * | 11/2020 | Tsuji | F16B 35/06 |
| 10,850,376 | B2 * | 12/2020 | Komatsu | B25B 29/02 |
| 10,981,255 | B2 * | 4/2021 | Hohmann | B25B 29/02 |
| 11,819,964 | B2 * | 11/2023 | Ogata | F16B 31/04 |
| 2017/0203397 | A1 * | 7/2017 | Gethings | F16B 31/043 |
| 2020/0171636 | A1 * | 6/2020 | Tsuji | F16B 35/06 |
| 2020/0171637 | A1 * | 6/2020 | Komatsu | G01L 5/24 |
| 2021/0138594 | A1 * | 5/2021 | Ogata | G01L 5/243 |
| 2022/0152803 | A1 * | 5/2022 | Asplund | B25B 13/463 |

OTHER PUBLICATIONS

International Searching Authority, “Search Report”, in Application No. PCT/IB2020/054581, dated Aug. 12, 2020, 3 pages.

* cited by examiner

MECHANICAL TENSIONING SYSTEM AND METHOD

RELATED APPLICATION DATA AND CLAIM OF PRIORITY

This application is a US National Stage Patent Application filed under 35 U.S.C. § 371 based upon International Patent Application No. PCT/IB2020/054581 filed 14 May 2020, which claims the benefit of South African Application 2020/00823, filed 10 Feb. 2020, which claims the benefit of South African Application 2019/03053, filed 16 May 2019, the entire contents of all of which are hereby incorporated by reference as if fully set forth herein for all purposes.

FIELD OF INVENTION

The invention relates to a mechanical tensioning system, particularly a removable mechanical tensioning system, a mechanical tensioning tool, particularly a removable mechanical tensioning tool, and a method of stretching a bolt or stud axially.

BACKGROUND OF THE INVENTION

In many conventional fastening applications employing bolts/studs, for example, fastening of objects such as flanges together, at least one bolt/stud is located in the objects via suitably aligned apertures and a nut is tightened around the bolt/stud with torque applied to the nut via a suitable tool such as a wrench. This technique, colloquially referred to as "torqueing the bolt/stud and/or nut", relies on torque applied to the nut to axially stretch, or in other words tension, the bolt/stud in a well-known and desirable fashion but results in undesirable torsional twisting of the bolt/stud which is affected by varying friction coefficients of engaging surfaces between the nut and/or bolt/stud and/or object. Torsional twist becomes a major concern as the length of the bolt/stud increases. Moreover, frictional forces can account for up to 80% of energy required to achieve correct bolt load when torqueing a nut in a conventional manner.

Because of this combination of friction & torsion, the resultant accuracy of torqueing is typically within 25% range of target.

To address this problem, hydraulic bolt/stud tensioners which tension bolts/studs hydraulically without having to rely on applying torque to nuts are commonly used to tension bolts/studs in certain applications, for example, industrial applications where bolts/studs have diameters ranging from M 20 (¾ inch or 19.05 mm) to M 100(4 inch 101.6 mm). Whilst customised hydraulic bolt tensioners have been manufactured to accommodate bolts/studs outside these ranges, bolts/studs on the smaller size of M20 are generally torqued.

For those skilled in the art, it is generally accepted that the accuracy of bolt tensioning is much greater that torqueing and typically produces results within 5% of target.

Some drawbacks of existing hydraulic bolt/stud tensioners, especially for use in tensioning smaller diameter bolts/studs, is that they require the use of bulky and expensive hydraulic cylinders, hydraulic fluid, pumps and hoses in order to achieve the aforementioned desirable axial bolt/stud stretch. These components are inconvenient and impractical to use in many applications especially in confined spaces or working at heights.

The Inventors are aware of conventional devices which rely on mechanical means to tension bolts. The principle of operation of many of these devices is to replace conventional nuts by providing "stay-on" mechanical tensioning solutions wherein the devices are located on bolts/studs and are operated to mechanically tension the bolts/studs and remain attached in lieu of the nuts until removed, possibly for re-use.

Though desirably tensioning the bolt/studs, the stay-on nature of the aforementioned mechanical tensioning devices requires that separate devices be used in lieu of conventional nuts for each and every bolt/stud which requires tensioning. This of course requires that sufficient stock of these devices be kept at hand for fastening applications. As the devices of the aforementioned type are considerably more expensive than conventional nuts and are typically operated by specifically designed hydraulic torque wrenches adapted to engage and operate said devices, the aforementioned mechanical tensioning solution is costly, and effectively makes it inaccessible for many, for example, members of the general public.

The present invention seeks to address the drawbacks evident in conventional techniques employed to tension bolts/studs and provide a solution which offers an affordable and accessible means to present best bolt tightening practices for generally smaller bolts/studs as will be evident from the disclosure which follows.

SUMMARY OF THE INVENTION

According to a first aspect of the invention, there is provided a removable mechanical tensioning system for stretching an elongate member in an axial direction, the elongate member being located in and attachable to an object via a nut, wherein the system comprises:

- an anti-rotation member; and
- a tensioner device defining an interior within which the elongate member and nut are locatable, in use, wherein the anti-rotation member is removably attachable to the tensioner device and the elongate member, and wherein the tensioner device comprises or is operatively coupled to a nut engaging assembly configured to engage the nut, in use, such that displacement of at least a transversely displaceable part of the tensioner device in a transverse direction, transverse to the axial direction, with a holding force applied to the anti-rotation member to limit displacement of the anti-rotation member and the elongate member in the transverse direction, causes stretch of the elongate member in the axial direction and automatic actuation of the nut engaging assembly to bring about displacement of the nut in the transverse direction relative to the stretched elongate member.

The displacement of the nut may be automatic and/or simultaneous. The nut engaging assembly may be configured to displace the nut in the transverse direction automatically and/or simultaneously with stretching of the elongate member.

It will be appreciated that the nut engaging assembly may be configured to displace the nut in the transverse direction upon displacement of at least part of the tensioner device with a torque and/or force which is lower than torque and/or force applied to the bring about operative displacement of the transversely displaceable part of the tensioner device to cause axial stretch of the elongate member. In other words, the nut may be automatically and/or simultaneously tightened around the stretched elongate member with a lower torque than that applied to the tensioner device.

It will be understood that "automatic and/or simultaneous" displacement of the nut may be understood to mean displacement and/or tightening of the nut about the stretched elongate member without the need for additional tools and/or action outside of the system described herein and/or force or torque applied to displace the transversely displaceable part of the tensioner device in the transverse direction and/or the holding force. In other words, no other means need be used outside of the system disclosed herein, with the single action of the transverse displacement of the transversely displaceable part of the tensioning device (with the holding force being applied to the anti-rotation member), to automatically and/or simultaneously axially stretch the elongate member and turn or tighten the nut around the elongate member so as to preserve said axial stretch of the elongate member.

The lower torque applied by the nut engaging assembly to bring about automatic and/or simultaneous displacement of the nut may be derived from and may be lower than the torque applied to displace the transversely displaceable part of the tensioner device in the transverse direction.

The tensioner device may comprise:

a base portion;

a friction element; and a tensioning body attached to the base portion while abutting the friction element, wherein the tensioning body is freely displaceable in the transverse direction relative to the base portion and the friction element.

The tensioning body may be freely displaceable relative to the friction element in a frictional fashion, at least in use. This may be due to the co-efficient of friction between the tensioning body and the friction element.

It will be understood that, in use, the base portion operatively abuts a surface adjacent to the nut. The axial stretch of the elongate member may be along its longitudinal axis.

The tensioning body may be the transversely displaceable part of the tensioner device which may be transversely displaceable, in use, in response to an applied force or torque. It follows that the nut engaging assembly may be configured to automatically and/or simultaneously displace the nut in the transverse direction upon displacement of at least part of the tensioning body with a torque value which is lower than the torque applied to the bring about displacement of at least the transversely displaceable part of the tensioner device.

The tensioning body may define a bore having an axis aligned with a central axis of the tensioning device, and a chamber in communication with the bore. The central axis of the tensioning device may be an axis along which the interior of the tensioning device extends. The chamber may be shaped and/or dimensioned to house all or part of the nut engaging assembly.

The nut engaging assembly may be operatively arranged with the base portion and/or the tensioning body such that, in use, with the elongate member with the nut attached located in a bore of the tensioner device, the nut engaging assembly operatively engages the nut such that with the anti-rotation member attached to both the tensioner device and the elongate body, and with a holding force which restricts displacement of the anti-rotation member and the elongate member in the transverse direction being applied to the anti-rotation member, displacement of the tensioning body in the transverse direction causes:

displacement of the anti-rotation member and stretch of the elongate member in the axial direction; and actuation of the nut engaging assembly to bring about automatic displacement of the nut in the transverse direction relative to the stretched elongate member.

The actuation of the nut engaging assembly may be automatic and/or simultaneous as a result of operative cooperation between the nut engaging assembly and the tensioning body during displacement of the tensioning body.

The tensioning body may be substantially cylindrical extending between first and second end portions but it will be appreciated that the tensioning body may take any three dimensional shape. The first end portion of the tensioning body may define engaging formations within the bore for engaging the anti-rotation member, in use. The chamber may be provided in the second end portion.

The bore of the tensioning body may be a cylindrical bore. The chamber of the tensioning body may be a cylindrical chamber.

The tensioning body may be attached to the base portion adjacent the second end portion thereof.

The tensioning body may comprise a handle operatively attached thereto. Instead, the tensioning body may comprise a coupling to couple the tensioning body to a handle. The handle and/or coupling may comprise a suitable a load gauge.

It will be appreciated that the system may comprise the handle.

Displacement in the transverse direction may be rotation about a central axis of the tensioning device which may be aligned with a longitudinal axis of the elongate member, in use. From the description which follows the transverse direction may be clockwise or anti-clockwise about the central axis.

The base portion may define an aperture. The aperture may have an axis aligned with the central axis. The base portion may comprise of one or more bearing elements which are operatively engagable with the tensioning body so as at least to facilitate free displacement of the tensioning body in the transverse direction. In one example, embodiment, the tensioning body may define a circumferentially extending groove on an outer surface thereof adjacent the second end portion, within which the bearing elements are locatable. In this way, at least one of the bearing elements may effectively attach the tensioning body to the base portion in a displaceable fashion as described herein.

As mentioned, in use, the base portion rests on the object and is immovable relative to the same. In this way, torque applied to the tensioning body may effectively stretch the elongate member axially though co-operation with the anti-rotation member but nut face friction is eliminated as the friction is taken up by the tensioning body frictionally engaging the friction element.

The friction element may define an aperture. The aperture of the friction element may have an axis aligned or at least parallel with the central axis. The friction element may be, at least in part, sandwiched between the tensioning body and the base portion. The friction element may not be moveable relative to the tensioning body and/or the base portion. In one example embodiment, the friction element is attached to the base portion in a fixed/immovable fashion. A second end of the tensioning body may define a surface which abuts the friction element when the tensioning body is attached to the base portion.

In one example embodiment, the nut engaging assembly may comprise a resilient nut engaging member adapted to engage the nut, in use, wherein the resilient nut engaging member co-operates with the displaceable part of the tensioner device during displacement thereof in the transverse direction to cause loading of the resilient nut engaging member which causes displacement of the nut with a lower torque than the torque applied to the transversely displaceable part of the tensioner device, in the transverse direction relative to the stretched elongate member upon release of said loading. The resilient nut engaging member may be operatively arranged with the base portion and/or the tensioning body such that, in use, the displacement of the tensioning body in the transverse direction causes loading of the resilient nut engaging member and automatic and/or simultaneous displacement of the nut in the transverse direction relative to the stretched elongate member. For example, upon release of said loading.

The chamber may be shaped and/or dimensioned to house the resilient nut engaging member, wherein the chamber defines loading formations for engaging with the resilient nut engaging member such that, in use, displacement of the tensioning body causes the loading formations to displace the resilient nut engaging member. The displacement of the tensioning body, in use, may cause the loading of the resilient nut engaging member. The engaging formations may be in the form of castellations, or any other suitable engaging formations.

The resilient nut engaging member may in the form of a resilient spring-like member extending between a first end portion and a second end portion, wherein a bore is provided there through. The bore may have an axis aligned with the central axis. The first end portion may define complementary engaging formations to engage the loading formations. The second end portion may define nut engaging formations for engaging the nut in a gripping or holding fashion, in use. The nut may be a conventional a nut having a polygonal profile but any profile nut may be used within the context of the present disclosure. The elongate member may be a bolt or a stud.

The resilient nut engaging member may comprise a load release mechanism to release the loaded resilient nut engaging member causing displacement thereof thereby to displace the nut in the transverse direction, in use.

The resilient nut engaging member may be locatable within the chamber of the tensioning body such that the axes of the bores of both parts are aligned.

In another example embodiment, the nut engaging assembly may comprise a clutch arrangement configured to engage the nut and displace the nut in the transverse direction with a lower torque than the torque applied to the transversely displaceable part of the tensioner device. In other words, the clutch arrangement may be configured to engage the nut and displace the nut in the transverse direction automatically and/or simultaneously and with a lower torque than the torque applied to the tensioning body to bring about displacement thereof in the transverse direction.

The clutch arrangement may engage with a friction body located in the tensioning body and/or the base portion, and the nut, in use, such that interaction of the clutch arrangement and the friction body during the displacement of the transversely displaceable part of the tensioning device in the transverse direction causes displacement of the nut with a lower torque than that applied to the transversely displaceable part. It will be appreciated that displacement of the nut with a lower torque may be due to frictional engagement of the clutch arrangement and the friction body. In other words, the slippage between the clutch arrangement and the friction body.

In one example embodiment, at least one part of the clutch arrangement is freely displaceable relative to the tensioning body and/or the base portion in the transverse direction. The transverse direction may be a tightening direction or a clockwise direction to the central axis when viewed from above. The direction opposite to the transverse direction or in other words the opposite direction may be a loosening direction or an anti-clockwise/counter-clockwise direction to the central axis when viewed from above.

The clutch arrangement may be located in the chamber of the tensioning body. In this regard, the chamber may be shaped and/or dimensioned to house the clutch arrangement. The friction body may be in the form of a friction bush located in a seat provided within the chamber of the tensioning body.

The clutch arrangement may comprise:

a nut rotating socket; and a one way clutch assembly which interfaces with the friction body and co-operates with the nut rotating socket such that, in use, application of torque to bring about displacement of the displaceable part of the tensioner device in the transverse direction causes the one way clutch assembly to be operated to a locked condition in which it is frictionally displaceable relative to the friction body only so as to limit the torque applied to the nut located operatively in nut rotating socket to a lower value than that of the torque applied to the displaceable part of the tensioner device.

It will be appreciated that displacement of the displaceable part of the tensioner device in a direction opposite to the transverse direction, in use, may cause the one way clutch assembly to be operated to an activated condition which permits free displacement of the nut rotating socket and/or the tensioning body relative to the clutch assembly. The friction body may be constructed out of a similar material as the friction member.

The one way clutch assembly may comprise a clutch disk locatable in and displaceable within a sleeve, wherein the clutch disk comprises one or more peripheral apertures within which clutch elements may be locatable. The clutch elements facilitate operation of the one way clutch assembly between the locked and activated conditions, wherein in the locked condition the clutch disk is locked against displacement within the sleeve. In the activated condition the clutch disk is freely displaceable within the sleeve. The clutch elements may interferingly be displaceable within zones defined by the sleeve and the clutch disk to facilitate operation of the one way clutch. It will be noted that due to the interaction with the clutch elements, the clutch disk is the at last one part of the clutch arrangement freely displaceable in the transverse direction in the activated condition.

Differently defined, in use, the tensioning body may be configured to actuate the clutch assembly between the locked and activated conditions. In this regard, displacement of the tensioning body, in use, in the transverse direction causes operation of the clutch assembly to the locked condition. In the locked condition, the clutch disk is locked against displacement within the sleeve, wherein further displacement of the tensioning body in the transverse direction causes displacement of the sleeve of the clutch assembly relative to the friction bush which it abuts in a frictionally engaging manner. It will be noted that the coefficient of friction between the sleeve and friction bush may be selected such that displacement of the friction bush relative to the sleeve occurs during displacement of the tensioning body in the transverse direction.

Rotation of the tensioning body in the direction opposite to the transverse direction causes operation of the clutch assembly to the activated condition, in which the clutch disk is free to rotate within the sleeve in the transverse direction.

When the clutch disk is in the activated condition, it will be appreciated that the tensioning body is free to rotate in the direction opposite to the transverse direction.

The clutch disk and the nut rotating socket may engage with each other via suitable castellations which allow for a degree of play before actuation of the clutch to a locked and/or activated conditions. In one example embodiment, the clutch disk may comprise grooves within which castellations of the nut rotating socket may be locatable in, wherein the nut rotating socket is configured to engage the clutch disk to actuate the same only after a degree of displacement of the nut rotating socket. In this way, when torque is applied to displace the displaceable part of the tensioner body, the nut rotating socket only operatively engages the clutch to operate the same to the locked condition after a predetermined amount of displacement or rotation of the nut rotating socket.

In one example embodiment, the tensioning body may comprise a retaining member to retain the nut engaging assembly in the chamber of the tensioning body. The retaining member may define the surface of the tensioning body which abuts the friction element when the tensioning body is attached to the base portion. The retaining member may be removably attachable to the tensioning body. For example, in a screw-threaded fashion. The nut rotating socket may be operatively located in a nested fashion within the retaining member.

It will be appreciated that all the components of the clutch arrangement may comprise apertures which are aligned with the central axis.

The anti-rotation member may comprise first engaging formations suitable for attaching the anti-rotation member to the elongate member in a removable fashion, in use. The first engaging formations may be mated for engagement with complementary engaging formations on the elongate member. The first engaging formations and complementary engaging formations on the elongate member may be screw-threads.

The anti-rotation member may comprise second engaging formations suitable for attaching the anti-rotation member to the tensioning body in a removable fashion, in use. The second engaging formations may be mated for engagement with complementary engaging formations within the bore of the tensioning body. The second engaging formations and complementary engaging formations provided within the bore of the tensioning body may be screw-threads. In some example embodiments, the screw-threads may be buttress or trapezoidal screw threads.

The anti-rotational member may removably attachable to the tensioning body in a nested fashion. Differently stated, the bore tensioning body may be configured to receive the anti-rotation member within the bore thereof in a removably attachable nested fashion.

The anti-rotation member may comprise a cylindrical portion defining a bore therethrough. The bore of the cylindrical portion may have an axis alignable with the central axis, in use. The first engaging formations are provided on an interior of the cylindrical portion, and wherein the second engaging formations are provided on an exterior of the cylindrical portion. It will be noted that the bore of the cylindrical portion may be cylindrical. The bores and chamber described herein as being cylindrical will be understood to have a cylindrical profile.

The anti-rotation member may comprise a handle portion operatively connected to the cylindrical portion. In this way, the holding force may be applied by a person and may be such that it allows for axial displacement of the anti-rotation member but restricts displacement of the anti-rotation member in the transverse direction. In other words, the holding force restricts displacement of the anti-rotation member in only the transverse direction. It will be understood that the anti-rotation member and the tensioner device may co-operatively cause axial stretch of the elongate member in response to displacement of the transversely displaceable part of the tensioner device.

The handle portion may comprise a tool engaging portion having a bore with an axis aligned or alignable with the axis along which the bore of the cylindrical portion extends. The tool engaging portion may comprise or may be in the form of a nut which may be integral with the cylindrical portion. In this way a person may either apply the holding force with their hands or via a suitable tool having complementary engaging formations to engage the tool engaging portion. The suitable tool may thus be a spanner, or the like.

It will be appreciated that a portion of the elongate member must protrude from the nut. The protruding length of the elongate member must be at least equal to a diameter of the elongate member.

Moreover, the portion of the elongate member protruding from the nut may operatively be engageable by the anti-rotation member.

It will be noted that the bores and chambers of the components of the tensioning device and/or the nut engaging assembly may all be aligned and may all extend through the tensioning device and/or assembly.

The system may be a removable system from the elongate member and nut after axially stretching the elongate member and automatically and/or simultaneously displacing the nut around the axially stretched member.

According to another aspect of the invention, there is provided a removable mechanical tensioning system for stretching an elongate member in an axial direction, the elongate member being located in and attachable to an object via a nut, wherein the system comprises:

- an anti-rotation member removably attachable to the elongate member, in use; and
- a tensioner device defining an interior extending along a central axis, wherein the tensioner device comprises:
  - a base portion;
  - a friction element;
  - a tensioning body attached to the base portion while abutting the friction element, wherein the tensioning body is freely displaceable relative to the base portion and the friction element in a transverse direction, transverse to the axial direction, and wherein the anti-rotation member is removably attachable to the tensioning body, in use; and
  - a resilient nut engaging member being adapted to engage the nut, in use, wherein the resilient nut engaging member is operatively arranged with the base portion and/or the tensioning body such that, in use, the elongate member with the nut attached thereto is located in the interior of the tensioner device such that the resilient nut engaging member operatively engages the nut, the anti-rotation member is attached to both the tensioner device and the elongate body, and a holding force which restricts displacement of the anti-rotation member and the elongate member in the transverse direction is applied to the anti-rotation member whilst the tensioning body is displaced in the the transverse direction causes displacement of the anti-rotation member and stretch of the elongate member in the axial direction; and loading of the resilient nut engaging member to cause automatic and/or simultaneous displacement of the nut in the transverse direction relative to the stretched elongate member.

According to another aspect of the invention, there is provided a removable mechanical tensioning system for stretching an elongate member in an axial direction, the elongate member being located in and attachable to an object via a nut, wherein the system comprises:

an anti-rotation member removably attachable to the elongate member, in use; and a tensioner device defining an interior extending along a central axis, wherein the tensioner device comprises:

a base portion;

a friction element;

a tensioning body attached to the base portion while abutting the friction element, wherein the tensioning body is freely displaceable relative to the base portion and the friction element in a transverse direction, transverse to the axial direction, and wherein the anti-rotation member is removably attachable to the tensioning body, in use; and a clutch arrangement being adapted to engage the nut, in use, wherein the clutch arrangement is operatively arranged with the base portion and/or the tensioning body such that, in use, the elongate member with the nut attached thereto is located in the interior of the tensioner device such that the clutch arrangement operatively engages the nut, the anti-rotation member is attached to both the tensioner device and the elongate body, and a holding force which restricts displacement of the anti-rotation member and the elongate member in the tensioning body is displaced in the transverse direction, wherein displacement of the tensioning body in the transverse direction causes displacement of the anti-rotation member and stretch of the elongate member in the axial direction; and operation of the clutch arrangement to cause automatic and/or simultaneous displacement of the nut in the transverse direction relative to the stretched elongate member.

According to another aspect of the invention, there is provided a removable mechanical tensioning system for stretching an elongate member in an axial direction, the elongate member being located in and attachable to an object via a nut, wherein the system comprises:

an anti-rotation member removably attachable to the elongate member, in use; and a tensioner device defining an interior extending along a central axis, wherein the tensioner device comprises:

a base portion;

a friction element;

a tensioning body attached to the base portion while abutting the friction element, wherein the tensioning body is freely displaceable relative to the base portion and the friction element in a transverse direction, transverse to the axial direction, and wherein the anti-rotation member is removably attachable to the tensioning body, in use; and a resilient nut engaging member being adapted to engage the nut, in use, wherein the resilient nut engaging member is operatively arranged with the base portion and/or the tensioning body such that, in use, the elongate member with the nut attached thereto is located in the interior of the tensioner device such that the resilient nut engaging member operatively engages the nut, the anti-rotation member is attached to both the tensioner device and the elongate body, and a and the elongate member in the transverse direction is applied to the anti-rotation member whilst the tensioning body is displaced in the transverse direction, wherein displacement of the tensioning body in the transverse direction causes displacement of the anti-rotation member and stretch of the elongate member in the axial direction; and loading of the resilient nut engaging member to cause automatic and/or simultaneous displacement of the nut in the transverse direction relative to the stretched elongate member; or a clutch arrangement being adapted to engage the nut, in use, wherein the clutch arrangement is operatively arranged with the base portion and/or the tensioning body such that, in use, the elongate member with the nut attached thereto is located in the interior of the tensioner device such that the clutch arrangement operatively engages the nut, the anti-rotation member is attached to both the tensioner device and the elongate body, and a holding force which restricts displacement of the anti-rotation member and the elongate member in the transverse direction is applied to the anti-rotation member whilst the tensioning body is displaced in the transverse direction, wherein displacement of the tensioning body in the transverse direction causes displacement of the anti-rotation member and stretch of the elongate member in the axial direction; and operation of the clutch arrangement to cause automatic and/or simultaneous displacement of the nut in the transverse direction relative to the stretched elongate member.

According to another aspect of the invention, there is provided a removable mechanical tensioning tool for use in stretching an elongate member in an axial direction, the elongate member being located in and attachable to an object via a nut, wherein the tool comprises a tensioner device substantially as described herein, and at least one handle attached or attachable to the tensioner device via a suitable coupling as described herein.

According to yet another aspect of the invention, there is provided a method for stretching an elongate member in an axial direction mechanically, the elongate member being located in and attachable to an object via a nut, wherein the method comprises:

locating a tensioner device over the elongate member and the nut such that a base of the tensioner device rests on the object and a nut engaging assembly of or coupled to the tensioner device engages the nut;

attaching an anti-rotation member to the elongate member and the tensioner device;

applying a holding force to the anti-rotation member to restrict displacement of the anti-rotation member in a transverse direction which is transverse to the axial direction; and simultaneously when applying the holding force to the anti-rotation member, displacing a displaceable part of the tensioner device in the transverse direction, wherein the displacement of the displaceable part of the tensioner device in the transverse direction causes displacement of the anti-rotation member and stretch of the elongate member in the axial direction; and actuation of the nut engaging assembly to bring about automatic and/or simultaneous displacement of the nut in the transverse direction relative to the stretched elongate member.

According to another aspect of the invention, there is provided a method for stretching an elongate member in an axial direction mechanically, the elongate member being located in and attachable to an object via a nut, wherein the method comprises:

locating a tensioner device over the elongate member and the nut such that a base of the tensioner device rests on the object and a resilient nut engaging member of the tensioner device engages the nut;

attaching an anti-rotation member to the elongate member and the tensioner device;

applying a holding force to the anti-rotation member to restrict displacement of the anti-rotation member in a transverse direction which is transverse to the axial direction; and simultaneously when applying the holding force to the anti-rotation member, displacing a tensioning body of the tensioner device in the transverse direction, wherein the tensioning body is freely displaceable relative to the base portion and a friction element of the tensioner device, wherein displacement of the tensioning body in the transverse direction causes displacement of the anti-rotation member and stretch of the elongate member in the axial direction; and loading of the resilient nut engaging member to cause automatic and/or simultaneous displacement of the nut in the transverse direction thereby automatically and/or simultaneously turning the nut relative to the stretched elongate member.

According to yet another aspect of the invention, there is provided a method for stretching an elongate member in an axial direction mechanically, the elongate member being located in and attachable to an object via a nut, wherein the method comprises:

locating a tensioner device over the elongate member and the nut such that a base of the tensioner device rests on the object and a clutch arrangement of the tensioner device engages the nut;

attaching an anti-rotation member to the elongate member and the tensioner device;

applying a holding force to the anti-rotation member to restrict displacement of the anti-rotation member in a transverse direction which is transverse to the axial direction; and simultaneously when applying the holding force to the anti-rotation member, displacing a tensioning body of the tensioner device in the transverse direction, wherein the tensioning body is freely displaceable relative to the base portion and a friction element of the tensioner device, wherein displacement of the tensioning body in the transverse direction causes displacement of the anti-rotation member and stretch of the elongate member in the axial direction; and operation of the clutch arrangement to cause displacement of the nut in the transverse direction relative to the stretched elongate member.

According to another aspect of the invention, there is provided a method for stretching an elongate member in an axial direction mechanically, the elongate member being located in and attachable to an object via a nut, wherein the method comprises:

locating a tensioner device over the elongate member and the nut such that a base of the tensioner device rests on the object and a resilient nut engaging member of the tensioner device engages the nut;

attaching an anti-rotation member to the elongate member and the tensioner device;

applying a holding force to the anti-rotation member to restrict displacement of the anti-rotation member in a transverse direction which is transverse to the axial direction; and simultaneously when applying the holding force to the anti-rotation member, displacing a tensioning body of the tensioner device in the transverse direction, wherein the tensioning body is freely displaceable relative to the base portion and a friction element of the tensioner device, wherein displacement of the tensioning body in the transverse direction causes displacement of the anti-rotation member and stretch of the elongate member in the axial direction; and loading of the resilient nut engaging member to cause automatic and/or simultaneous displacement of the nut in the transverse direction thereby automatically and/or simultaneously turning the nut relative to the stretched elongate member; or simultaneously when applying the holding force to the anti-rotation member, displacing a tensioning body of the tensioner device in the transverse direction, wherein the tensioning body is freely displaceable relative to the base portion and a friction element of the tensioner device, wherein displacement of the tensioning body in the transverse direction causes displacement of the anti-rotation member and stretch of the elongate member in the axial direction; and operation of the clutch arrangement to cause automatic and/or simultaneous displacement of the nut in the transverse direction relative to the stretched elongate member.

It will be appreciated that the method may comprise turning the nut about the elongate member prior to the use of a system comprising the tensioner device and anti-rotation member as described herein. In this way, the nut is loosely attached at the intersection of the elongate member and the object.

Once a desired loading of the elongate member has been achieved, the method may comprise removing the anti-rotation member and the tensioner device from the elongate member and nut respectively.

The method may comprise automatically and/or simultaneously displacing the nut in the transverse direction so as to maintain the axial stretch.

It will be appreciated by those skilled in the art that the comments above regarding the first aspect of the invention apply herein as well, mutatis mutandis. This is because the method described herein may be implemented by the system described herein. Moreover, the comments above regarding one aspect of the invention applies to all other aspects of the invention, mutatis mutandis.

DETAILED DESCRIPTION OF THE DRAWINGS

Figure 1:
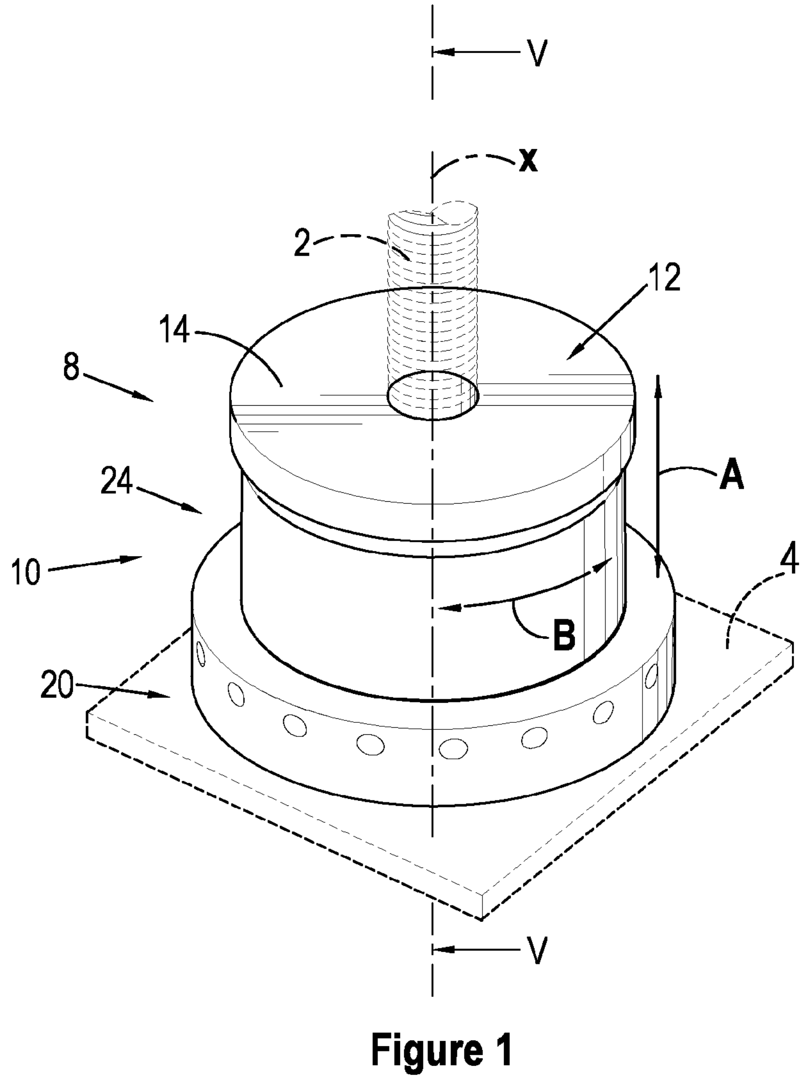
FIG. 1 shows a three-dimensional perspective view of a system in accordance with an example embodiment of the invention in an assembled state on a portion of an object shown in dotted lines, in use.

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances and are a part of the present invention. Thus, the following description is provided as illustrative of the principles of the present invention and not a limitation thereof.

It will be appreciated that the phrase "for example," "such as", and variants thereof describe non-limiting embodiments of the presently disclosed subject matter. Reference in the specification to "one example embodiment", "another example embodiment", "some example embodiment/s", or variants thereof means that a particular feature, structure or characteristic described in connection with the embodiment(s) is included in at least one embodiment of the presently disclosed subject matter. Thus, the use of the phrase "one example embodiment", "another example embodiment", "some example embodiment/s", or variants thereof does not necessarily refer to the same embodiment(s).

Unless otherwise stated, some features of the subject matter described herein, which are, described in the context of separate embodiments for purposes of clarity, may also be provided in combination in a single embodiment. Similarly, various features of the subject matter disclosed herein which are described in the context of a single embodiment may also be provided separately or in any suitable sub-combination.

Referring to FIGS. 1 to 4 of the drawings, a mechanical tensioning system for stretching an elongate member 2 in an axial direction A (FIG. 1) in accordance with an example embodiment of the invention is generally indicated by reference numeral 8. The axial direction may be in an upward and/or a downward axial stretching direction. The member 2 is located in and attachable to an object 4 via a nut 6. For ease of explanation and by way of a non-limiting example, the elongate member 2 is in the form of a conventional cylindrical bolt or stud having screw-threading 2.1 provided on an exterior surface thereof and the nut 6 is in the form of a conventional nut having internal threading matched for complementary engagement with the bolt/stud and a polygonal profile, for example, a hexagonal profile.

The system 8 has dimensions matched to the dimensions of the bolt/stud 2 and the nut 6. In this regard, it follows that the dimensions of the system 8 may be selected depending on the application and the system 8 typically caters for bolt/stud diameters between M8 (5⁄16" or 7.94 mm) and M18(3⁄4" or 19.05 mm).

The object 4 may be in the form of a flange but it will be appreciated that the object may be any object to which the bolt/stud 2 is located in.

As will become evident from the descriptions which follow, the system 8 is typically configured to axially stretch a bolt/stud 2 and automatically and/or simultaneously turn/tighten the nut around the bolt/stud with a lower torque than that applied to stretch the bolt/stud 2 thereby preserving said axial stretch of the bolt/stud 2. The system 8 is also advantageously removable after use. Moreover, the system 8 requires no additional non-conventional tools to be used to operate in the manner as described herein.

The system 8 comprises a tensioner device 10 defining an interior in the form of a central bore 11 extending therethrough along a central axis X; and an anti-rotation member 12. It will be understood by those skilled in the art that the interior or central bore 11 of the device 10 is typically defined by the various bores and/or chambers and/or apertures making up the tensioner device 10 and/or the component/s located within the device 10 in substantially a co-axial fashion, either nested or axially spaced.

The anti-rotation member 12 is removably attachable to the bolt/stud 2 and comprises a handle portion 14 and a cylindrical portion 16 defining a bore 18 therethrough having an axis alignable with the central axis X. The handle portion 14 may take on any shape to facilitate gripping thereof. As will be mentioned below in a preferred example embodiment, the handle portion 14 may comprise or may be attached to a reaction arm/suitable member so as to apply the holding force envisaged herein.

In one example embodiment, the cylindrical portion 16 defines first engaging formations in the form of screw-threading 16.1 provided on an interior thereof located in the bore 18 for engaging the screw-threading 2.1 of the bolt/stud 2 in a complementary fashion. It will be appreciated that the bore 18 and/or the screw-threading 16.1 may be mated to the shape and/or dimensions of conventional bolts/studs 2.

In one example embodiment, the cylindrical portion 16 further defines second engaging formations in the form of screw-threading 16.2 provided on an exterior surface of the cylindrical portion 16 for operative engagement with the tensioner device 10 as will be evident from the description which follows.

Figure 4:
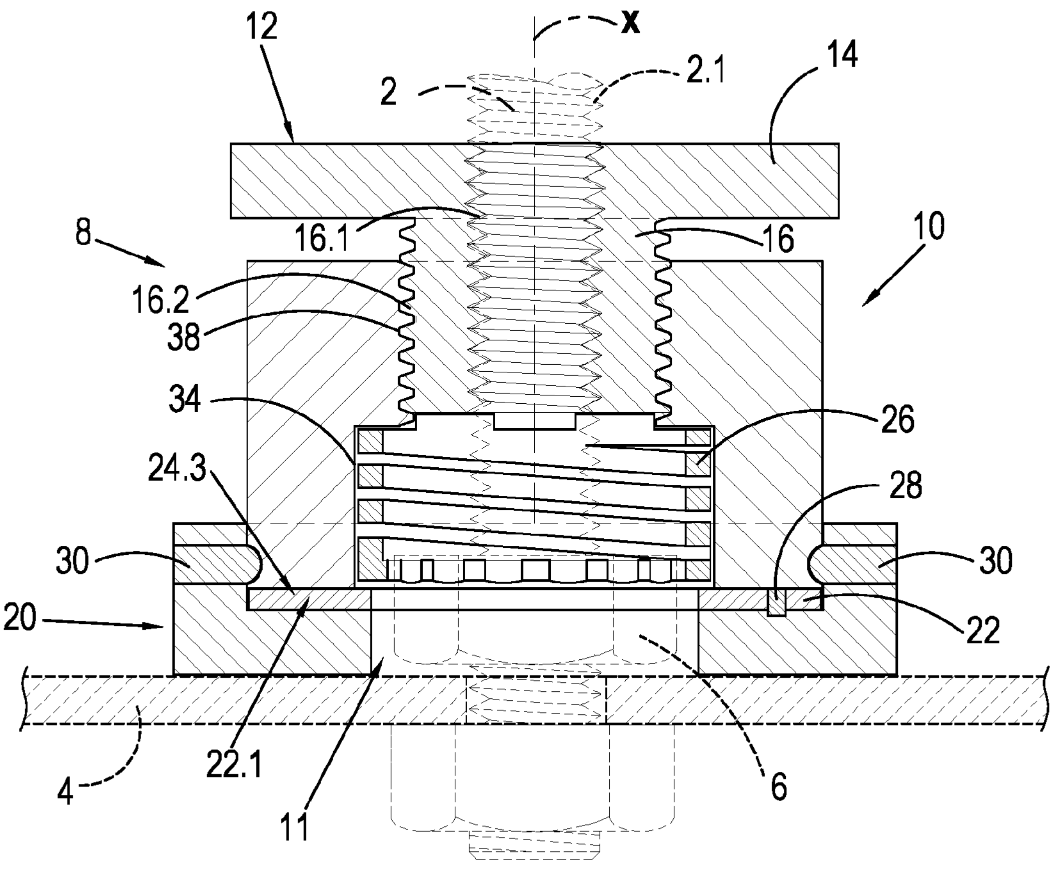
FIG. 4 shows a sectional side view of the system of FIG. 1 at V-V, in use, with a portion of an object, an elongate member and nut included in dotted lines for illustrative purposes.
Figure 5:
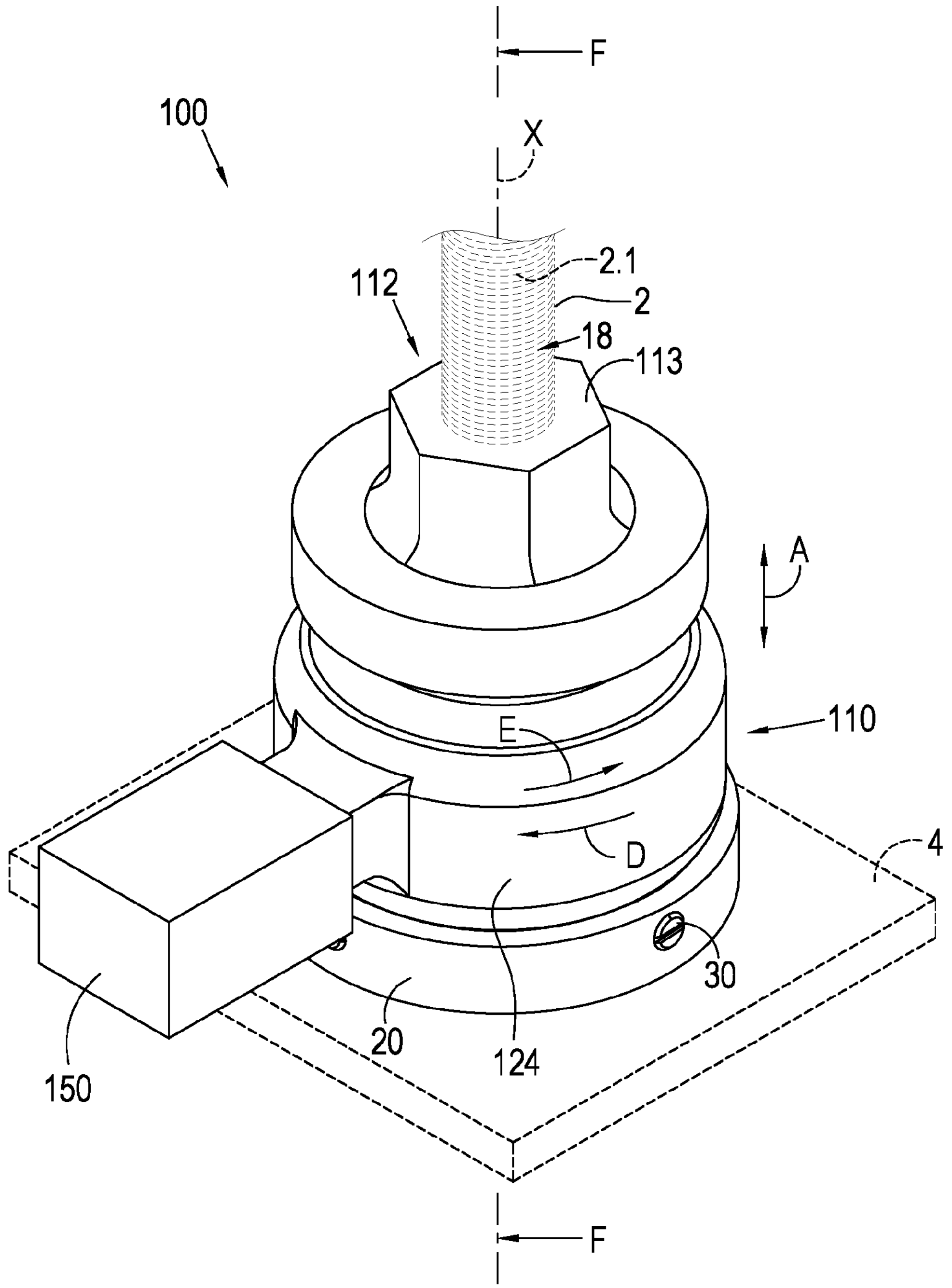
FIG. 5 shows a three-dimensional perspective view of another system in accordance with an example embodiment of the invention in an assembled state on a portion of an object shown in dotted lines, in use.

The tensioner device 10 comprises a plurality of co-operating parts. In particular, the device 10 comprises a base portion 20, a friction element 22, a tensioning body 24, and a nut engaging assembly 23 comprising a resilient nut engaging member 26 arranged in a generally nested fashion. In particular, the friction element 22 is attached to the base portion 20 in an immovable fashion, for example, via suitable one or more grub screws/pins 28, or the like. The tensioning body 24 is attached to the base portion 20, while abutting the friction element 22, by way of suitable bearing elements 30 in the form of ball plungers. The member 26 is arranged with the body 24 and is effectively sandwiched between the body 24 and base portion 20 as can be seen in FIG. 4 and as will be described below.

The tensioning body 24 is conveniently arranged to be freely displaceable relative to the base portion 20 and the friction element 22 in a transverse direction B (FIG. 1), transverse to the axial direction A. The tensioning body 24 displaceable in the transverse direction B may effectively be rotatably displaceable about the central axis X. In this regard, the tensioning body 24 is freely rotatable relative to the base portion 20 while abutting the friction element 22, in a clockwise and anti-clockwise fashion about the central axis X.

The tensioning body 24 is generally cylindrical and defines a bore 32 therethrough having an axis aligned with the central axis X, and a chamber 34 in communication with the bore 32. The chamber 34 is shaped and/or dimensioned to house the nut engaging member 26. In this regard, the chamber 34 defines loading formations 36 (better seen in FIG. 3) for engaging with the nut engaging member 26 such that, in use, displacement of the tensioning body 24 causes the loading formations 36 to displace the nut engaging member 26 as will be described below. In one example embodiment, the engaging formations 36 are in the form of castellations.

It will be noted that the tensioning body 24 may define engaging formations 38 within the bore 32, adjacent a first end portion 24.1 thereof, for engaging the second engaging formations 16.2 of the anti-rotation member 16, to attach the member 16 to the device 10 as will be described below.

A second end portion 24.2 of the body 24 may define the chamber 34. Moreover, the second end portion 24.2 has an operative surface 24.3 (FIG. 3) which abuts the friction element 22 such that the body 24 is frictionally displaceable relative to the friction element. It will be evident from the drawings that the tensioning body 24 is attached to the base portion 20 adjacent the second end portion 24.2 thereof. In particular, the second end portion 24.2 of the body 24 may define a circumferentially extending groove 24.4, within which the ball plungers 30 are located so as to retain the body 24 in attachment with the base portion 20 in a manner which prevents axial separation of the base portion 20 and the body 24 but allows for free rotational movement between the base portion 20 and the body 24, as well as between the body 24 and the friction element 22 which abuts the body 24.

It will be appreciated that the base portion 20 may define an aperture 41 (FIG. 2) having an axis aligned with the central axis X. The base portion 20 is also substantially cylindrical and has a generally U-shaped sectional profile. However, it will be understood that the outer appearance and/or shape of the base portion 20, or the tensioning body 24 may take on a variety of forms as will be understood by those skilled in the art.

The ball plungers 30 may be attached to the base portion 20 in a conventional fashion, for example, through machined apertures 31 and operatively project into a locating zone where the body 24 is locatable to engage the groove 24.4 in a manner described herein to effectively provide a bearing surface to assist in free rotation of the body 24.

The friction element 22 may be constructed of a different material than the base portion 20 and/or the body 24 and/or the member 26. In one example embodiment, the element 22 is in the form of a thrust washer with known and/or predetermined coefficient of friction. The thrust washer may be constructed of a composite material whilst the system 8 is constructed of a suitable metal such as high strength tensile steel. The thrust washer 22 is generally disk-shaped with a central aperture having an axis aligned or at least parallel with the central axis. As evident from the foregoing and the drawings, the thrust washer 22 is typically sandwiched between the tensioning body 24 and the base portion 20. The friction element 22 is immovable relative to the tensioning body 24 and/or the base portion 20. It will be understood that the friction element defines an operative surface 22.1 (FIG. 2) which abuts the surface 24.3 of the body 24.

Figure 2:
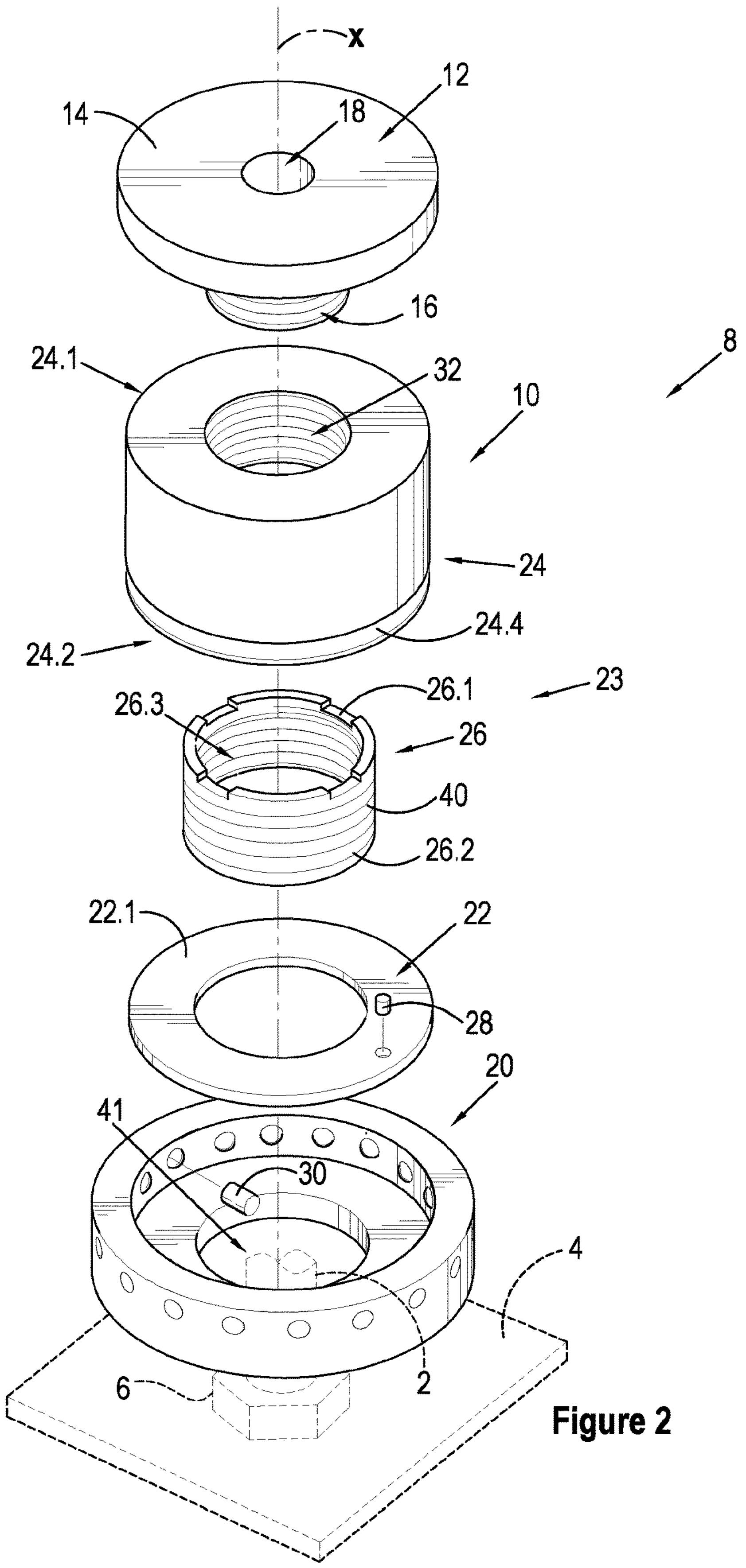
FIG. 2 shows a three-dimensional perspective view of a system in accordance with an example embodiment of the invention in an exploded state.
Figure 3:
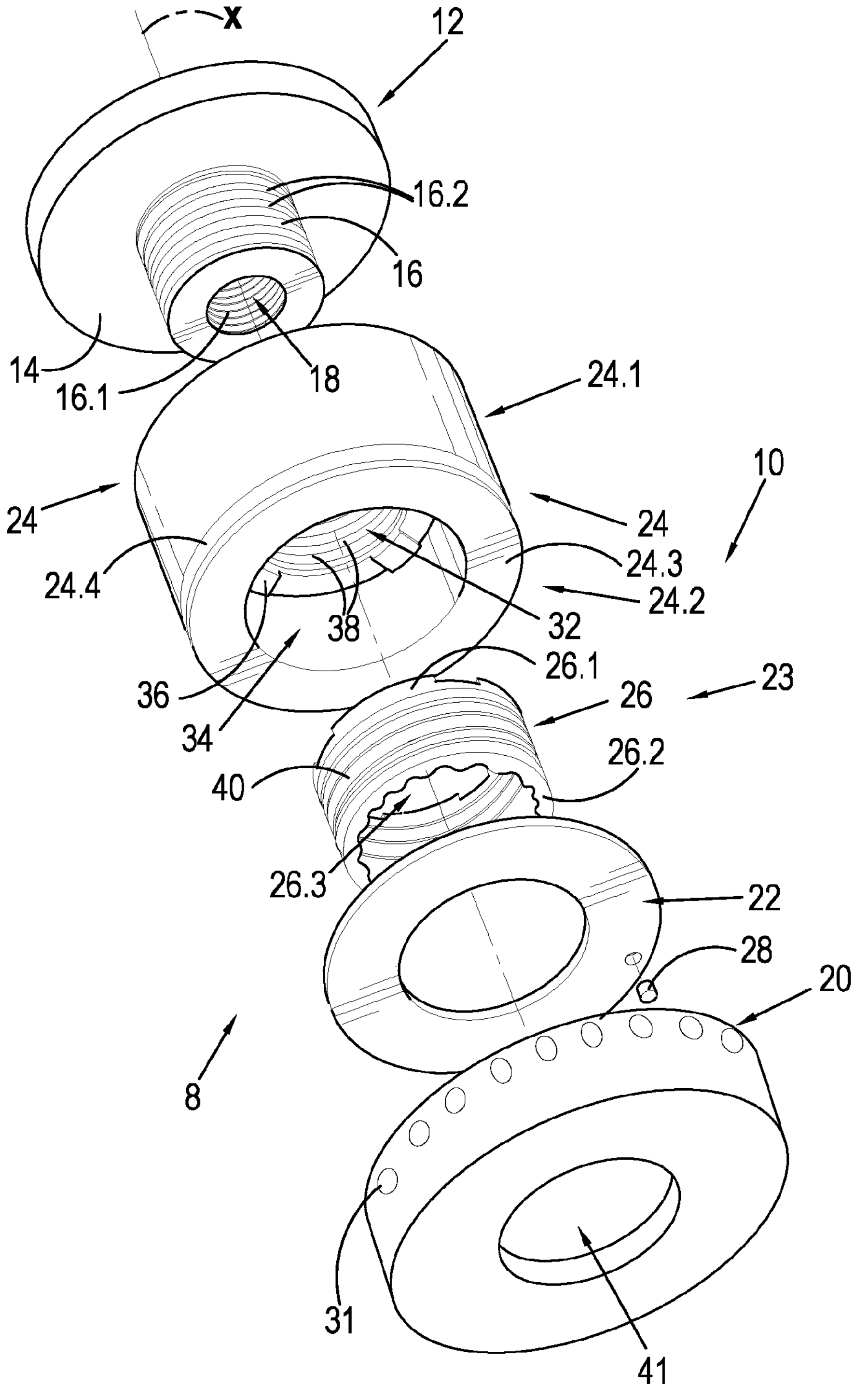
FIG. 3 shows another three-dimensional perspective view of a system in accordance with an example embodiment of the invention in an exploded state.

In one example embodiment, the resilient nut engaging member 26 may in the form of a spring-like member, for example, a machined spring body 40 extending between a first end portion 26.1 and a second end portion 26.2 (FIGS. 2 and 3). It will be understood that a bore 26.3 is provided through the resilient nut engaging member 26, the bore 26.3 having an axis aligned with the central axis X in assembly.

The first end portion 26.1 typically defines complementary engaging formations to engage the loading formations 36 in the chamber 34 of the body 24. In one example embodiment the formations 26.1, 36 are complementary castellations.

The second end portion 26.2 of the member 26 generally define nut engaging formations for engaging the nut 6 in a gripping fashion, particularly an outer surface thereof, in use. To this end, in one example embodiment, the nut engaging formations are teeth which project into the bore 26.3 of the member 26. It will be appreciated that the end portion 26.2 may be shaped and/or dimensioned to engage operative outer surfaces of a nut 6 of predetermined typically conventional shape and/or dimensions. In this way, different sized nuts 6 may be engageable by suitable dimensionally matched systems 8.

It will be noted that the end portion 26.1 of the member 26 is axially spaced from the thrust washer 22, in use, so that there is no abutment between these two components.

Though not illustrated, the system 8 may comprise a handle operatively attached or attachable in a removable fashion, for example, via a quick coupling, to the body 24 to bring about rotation thereof. The handle may be a handle with a suitable load gauge.

In construction, referring to FIGS. 1 to 4, the thrust washer 22 is attached to the base portion 20 in an immovable fashion via one or more pins 28 through aligned apertures provided on said components.

The member 26 is located in the chamber 34 and the body 24 is attached to the base portion 20 such that the surface 24.3 of the body 24 rests on and effectively abuts the thrust washer 22, and the ball plungers 30 are operatively located in the groove 24.4. In this way, the body 24, as well as the member 26 located in the chamber 34, are restrained from displacement, and thus disengagement from the base portion 20, in the axial direction A with at least the body 24 being free to rotate in the transverse direction B. It will be appreciated that the mating surfaces between the body 24 and the thrust washer 22 may be lubricated via a suitable lubricant prior to assembly as described herein.

In some example embodiments, the engaging formation 26.1 of the member 26 and the engaging formations 36 of the body 24 are mated in assembly and the portion 26.2 effectively rests on the thrust washer 22 to prevent removal of the member 26 from the chamber 34, wherein the end portion 26.2 is axially spaced from engagement with the thrust washer 22, in use, upon engagement with the nut 6 as will be described below.

In other example embodiments, the member 26 may be located in the chamber 34 such that it is restrained from removal from the chamber 34 by way of the thrust washer 22 but engagement of the formations 26.1, 36 together with the axial displacement of the portion 26.2 off the thrust washer 22 only occurs, in use, upon engagement with the nut 6.

In use, referring again to FIGS. 1 to 4 of the drawings, a bolt/stud 2 is located in the object 4 in a conventional fashion and a nut 6 is wound down on a free end of the bolt/stud and is tightened to a predetermined extent, typically by hand. In order to use the system 8 described herein, there must be a protrusion of a threaded portion of the bolt/stud 2 of at least one times the diameter of the bolt/stud 2.

The dimensions of the system 8 is selected based on the nut 6 and/or bolt/stud 2 dimensions as mentioned above. In particular, the member 12 is selected so that the bore 18 and/or screw-threading 16.1 is matched with the bolt/stud 2 and the device 10 is selected such that at least the end portion 26.2 is matched to the nut 6.

The tensioner device 10 is then located over the nut 6 and bolt/stud 2 such that the nut 6 and bolt/stud 2 is located through the central bore of the device 10 with the base portion 20 resting on the object 4, particularly an operative under surface of the base portion 20 rests on a surface of the object surrounding the nut 6 and bolt/stud 2.

With the base portion 20 resting on the object, the end portion 26.2 of the member 26 operatively engages the outer lateral peripheries of the nut 6 in a gripping fashion as mentioned above. It will be appreciated that upon engaging the nut 6, the end portion 26.2 of the member 26 is effectively axially spaced from the surface 22.1 of the thrust washer 22 so that there is no contact between these components, in use. In some example embodiments, this may also facilitate mating engagement of the formations 26.1 and 36, if not already engaged. In this regard, it will be noted that, in use, the body 24 is the only component which frictionally engages the thrust washer 22 in a displaceable fashion.

The anti-rotation member 12 is then brought into engagement and attached to both the device 10 and a free end of the bolt/stud 2 by simply winding the member 12 down relative to the bolt/stud 2 and the body 24, typically in a clockwise fashion until the exposed screw-threading of bolt/stud is engaged.

Depending on the example embodiment employed, the handle (not shown) may be attached to the body 24 via a quick coupling.

A holding force is then exerted on the member 12, for example, by way of a person's hand and/or a reaction arm/member (not shown) holding the handle portion 14 of the member 12 to prevent or restrict displacement of member 12 and thus the bolt/stud in the transverse direction B whilst allowing displacement of the aforementioned in the axial direction A.

Substantially simultaneously with the application of the holding force, bolt tensioning is then done in a conventional fashion by turning the handle clockwise about the axis X thereby causing displacement of the body 24 in the transverse direction B or in other words rotation of the body 24 about the axis X. It will be understood that the transverse direction B may be clockwise (to the axis X when viewed from above looking down) in the case of tensioning a bolt/stud 2 as described herein or counter-clockwise when loosening.

With the application of the holding force to the member 12, the body 24 freely rotates under load relative to the base portion 20 and the thrust washer 22 with the greatest friction encountered between abutting surfaces 22.1 and 24.3. Rotation of the body 24 and the simultaneous application of the holding force on the member 12 causes the bolt/stud 2 to axially stretch in a desirable manner. The force or toque applied to bring about rotation of the body 24 may be predetermined.

Moreover, as the body 24 rotates about the central axis X with the force being applied via the handle attached to the body 24, mating engaging formations 36 and 26.1 of the body 24 and the member 26, respectively, load the machined spring body 40 of the member 26 in a resilient manner thereby causing the same to also rotate in a resilient fashion in the transverse direction B thereby causing the nut 6 to rotate in the transverse direction B automatically and/or simultaneously and turn around the stretched bolt/stud 2 adjacent the intersection of the axially stretched bolt/stud 2 and the object 4 without inducing torsional twist of the bolt/stud 2. It will be noted that here the nut 6 merely preserves the axial stretch achieved by the system 8 by being turned at a low torque around the bolt/stud 2 as opposed to torqueing the bolt/stud 2 in a conventional fashion as described herein. In particular, it will be noted that the nut 6 is turned automatically or consequentially with a force or torque which is lower than the force or torque applied to bring about rotation of the body 24.

The body 24 is rotated by the handle until a desired bolt stretch load is achieved. This is typically monitored via the gauge provided on the handle. In any event, once desired bolt stretching has been achieved, the member 12 is removed from the bolt/stud and the device 10 by rotating the same in an anti-clockwise direction. The device 10 is then removed.

It will be noted that loosening of the nut/undoing the bolt/stud 2 stretch may be achieved with conventional tools such as hand wrenches.

Referring now to FIGS. 5 to 9 of the drawings, where a preferred example embodiment of a mechanical tensioning system for stretching an elongate member 2 in an axial direction A (FIG. 5) and automatically and/or simultaneously turning a nut 6 about the member 2 in accordance with an example embodiment of the invention is generally indicated by reference numeral 100. The system 100 is substantially similar to the system 8 described herein with reference to FIGS. 1 to 4 and thus similar parts will be labelled with similar reference numerals. Moreover, it will be understood by those skilled in the art that the description of components of the system 8 above apply mutatis mutandis to the system 100.

The system 100 is also configured to axially stretch a bolt/stud 2 and automatically and/or simultaneously turn/tighten the nut around the bolt/stud with a lower torque than that applied to stretch the bolt/stud 2 thereby preserving said axial stretch of the bolt/stud 2.

The system 100 comprises a tensioner device 110 defining an interior in the form of a central bore 111 extending therethrough along a central axis X, and an anti-rotation member 112. Like the device 10, the device 110 is a singular composite device comprised of a plurality of parts arranged around the central axis X which co-operate with each other to achieve desired axially stretch of the bolt/stud 2 and automatically and/or simultaneously turn/tighten the nut 6 around the bolt/stud with a lower torque than that applied to stretch the bolt/stud 2.

The device 110 typically defines a chamber 134 and a bore 131 as described herein with reference to the device 10.

The anti-rotation member 112 is substantially similar to the member 12 described herein but differs in that it comprises an integral nut 113. The nut 113 facilitates ease of holding the member 112 with a conventional tools such as a spanner, or the like. It will be understood that the member 112 may be shaped and/or dimensioned to be engageable with various tools or by the user's hand so as to apply the holding force previously described.

Another difference between the system 100 and the system 8 described herein is that the nut engaging assembly 23 in the system 100 is different to the assembly 23 of the system 8. In particular, instead of the resilient nut engaging member 26, the nut engaging assembly 23 of the system 100 advantageously comprises a clutch arrangement 126 configured to engage the nut 6 and displace the nut 6 in the transverse direction automatically and/or simultaneously and with a lower torque than the torque applied to the tensioning body 124. It will be understood by those skilled in the art that though the actual mechanism of operation of the clutch arrangement 126 may be different to the member 26, the end effect is the same in that the nut is automatically and/or simultaneously turned with lower torque than that applied to the tensioning body 124 so as to preserve the axial stretch of the bolt 2. It follows that other variations and mechanisms not described herein may be employed to achieve the same end described herein.

In some example embodiments, the clutch arrangement 126 may be engageable with a friction body in the form of a friction bush 127. The bush 127 may be located in a seat provided in the chamber 134 of the tensioning body 124.

Interaction of the clutch arrangement 126 and the friction bush 127 during the displacement of the tensioning body 124, particularly in the direction of arrow D, causes turning/tightening of the nut 6 with a lower torque than that applied to tensioning body 124 due to the frictional engagement of the clutch arrangement 126 and the friction bush 127. To this end, the bush 127 may be constructed of a similar composite material as the thrust washer 22 and may thus have a predetermined coefficient of friction.

The bush 127 may be a ring-like bush which is provided at a periphery of the arrangement 126, essentially surrounding it.

In one example embodiment, the clutch arrangement 126 may comprise a nut rotating socket 130; and a one way clutch assembly 132. The one way clutch assembly 132 comprises a clutch disk 135 locatable in and displaceable within a sleeve 136, wherein the clutch disk 135 comprises peripheral apertures or cut-away portions 135.1 within which clutch elements 138 are locatable. The assembly 132 fits in a nested fashion within the friction bush 127 and thus it will be noted that the assembly 132 defines a bore therethrough aligned with the central axis X.

The clutch elements 138 may be cylindrical rollers with tapered waists which collectively facilitate operation of the one way clutch assembly 132 between locked and activated conditions, wherein in the locked condition, in use, the clutch disk 135 is locked against displacement within the sleeve 136 during displacement of the tensioning body 124 in the direction of arrow D (clockwise). In the activated condition, the clutch disk 135 is freely displaceable within the sleeve 136 during displacement of the tensioning body 124 in the direction of arrow E (anti-clockwise).

In use, the operation of the clutch assembly 132 to the locked condition typically occurs when the body 124 is displaced in the direction of arrow D to axially stretch and tighten the nut 6 as will be discussed below. Conversely, in the activated condition, in use, the disk 135 is free to rotate about its axis, or is freely displaceable, in the direction of arrow D. In use, the operation of the clutch assembly 132 to the activated condition typically occurs when the body 124 is displaced in the direction of arrow E.

The clutch elements 138 may interferingly be displaceable within zones defined by the sleeve 136 and the clutch disk portions 135.1 to facilitate operation of the one way clutch between the locked and activated conditions. To this end, the cutaway portions 135.1 are tapered or have smaller cross-sectional areas in locations away from the direction of arrow E (when viewed from above) such that the elements effectively interferingly engage with the sleeve 136 and the disk 135 thereby locking the rotation of the disk 135 in the direction of arrow D.

It will be understood that, in use, displacement of the tensioning body 124 in the direction of arrow D operates the clutch assembly 132 to the locked condition and displacement of the body 124 in the direction of arrow E operates the clutch assembly 132 to the activated condition. It is in the locked condition that displacement of the body 124 causes the clutch assembly 132 to be displaced relative to the friction bush 127. In particular, the sleeve 136 is frictionally displaced relative to the bush 127 when the clutch assembly 132 is in the locked condition and the body 124 is displaced in the direction of arrow D.

The clutch disk 135 and the nut rotating socket 130 may engage with each other via suitable grooves 135.2 and male castellations 130.1 which allow for a relatively small degree of play before actuation of the clutch assembly 132 to a locked and/or activated conditions. Male castellations 130.1 are smaller in dimension than the grooves 135.2 to allow for a slight degree of play before the socket 130 operatively engages the disk 135.

In the present example embodiment of the system 100, the tensioning body 124 comprises a retaining member 125 which removably attaches to the body 124 thereby locking the arrangement 126 in the chamber of the body 124.

The member 125 may comprise screw-threading on an outer surface thereof for operative engagement with complementary screw-threading provided in the chamber of the body 124, particularly an interior surface thereof. It will be noted that in the example embodiment illustrated, the member 125 is attachable to the base 20 via the ball plungers 30. To this end, the member 125 defines the circumferentially extending groove 124.4 for location of the ball plungers 30. Moreover, the member 125 defines the operative surface or face 124.3 which interfaces with the thrust washer 22.

The body 124 may also advantageously comprise a tool attachment portion 150 which may be used for attachment to a suitable tool such as a tension wrench.

Figure 6:
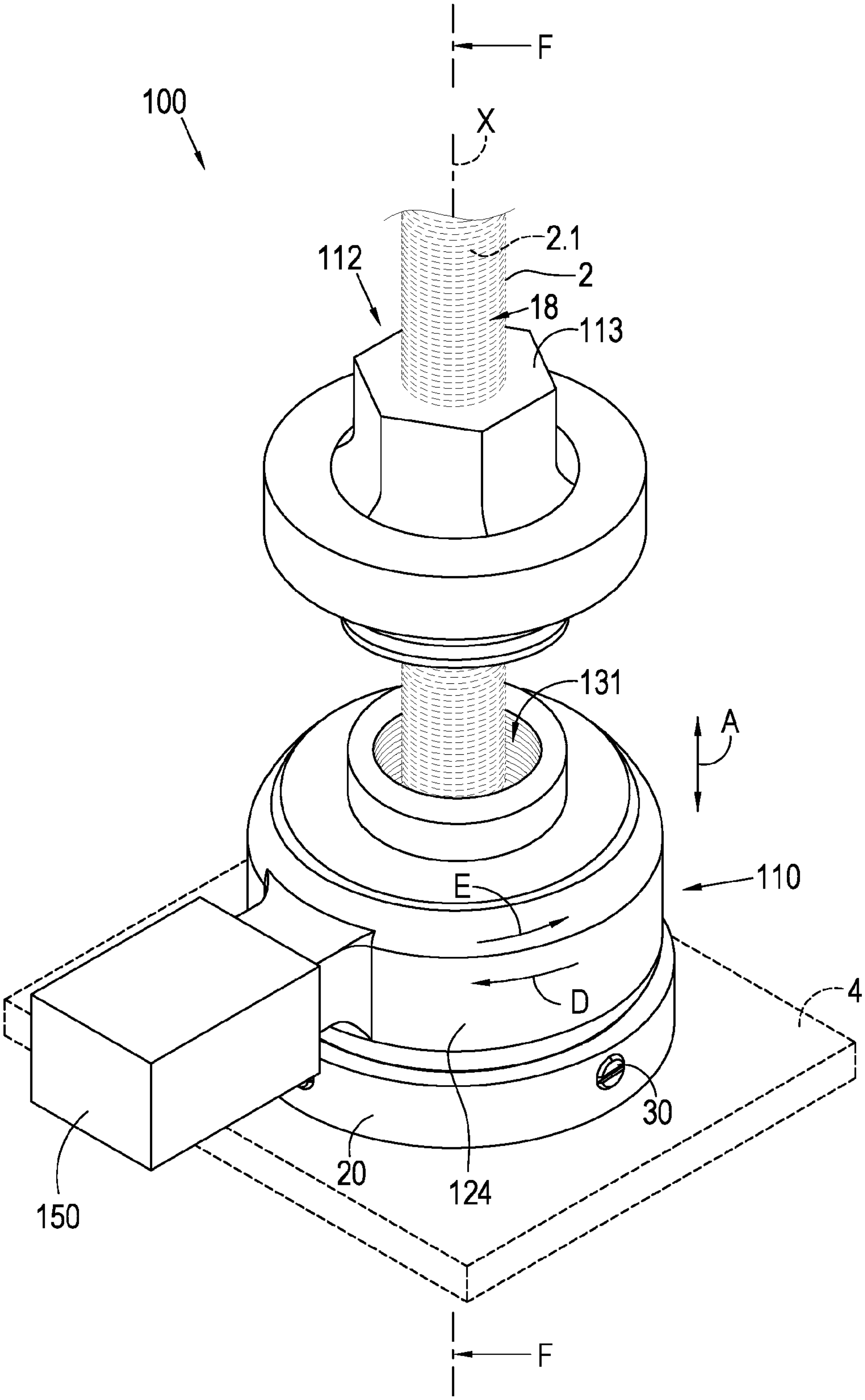
FIG. 6 shows another three-dimensional perspective view of the system of FIG. 5 prior to the coupling of the anti-rotation member.
Figure 7:
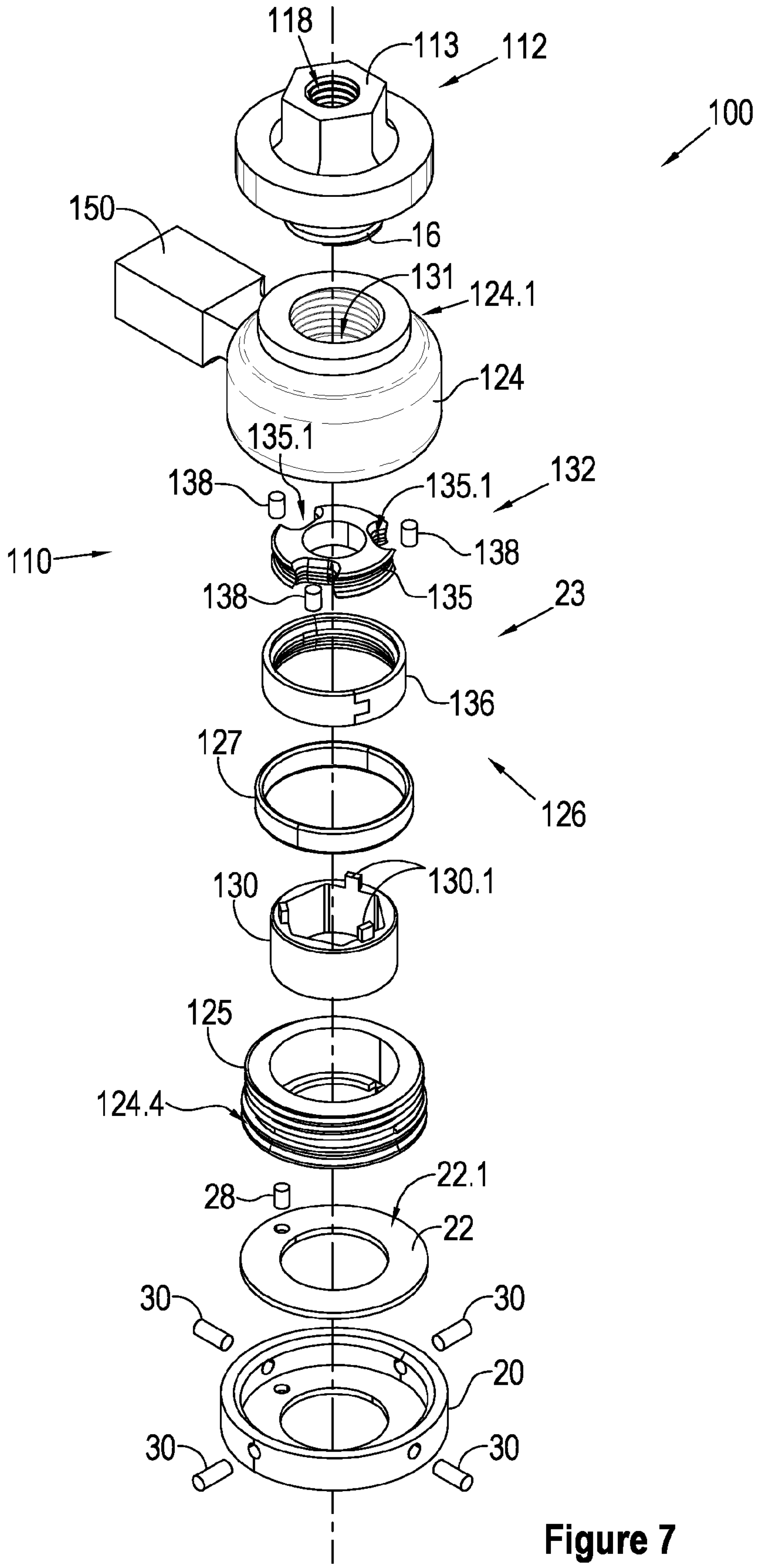
FIG. 7 shows a three-dimensional perspective view of the system of FIG. 5 in an exploded state.
Figure 8:
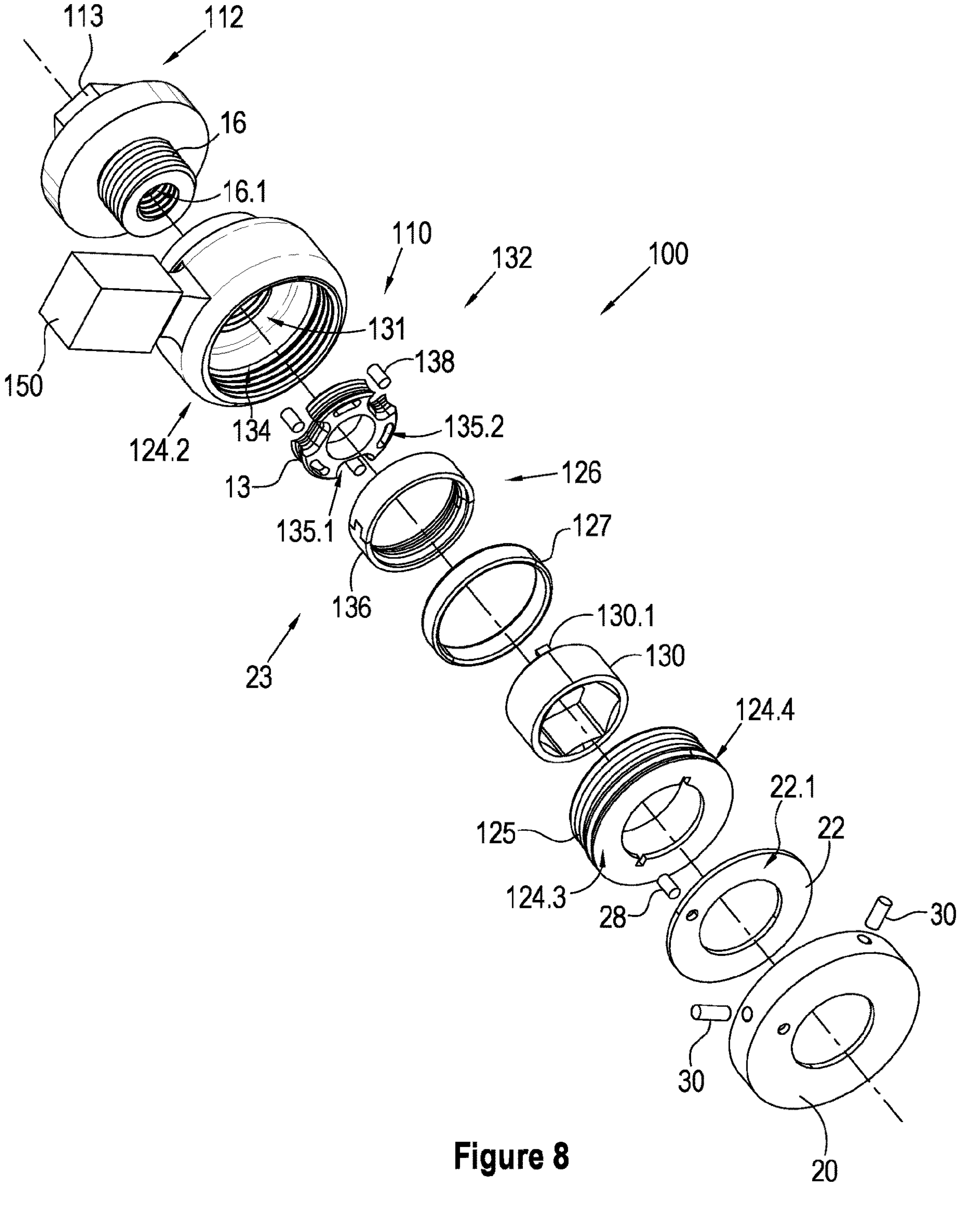
FIG. 8 shows another three-dimensional perspective view of the system of FIG. 5 in an exploded state.
Figure 9:
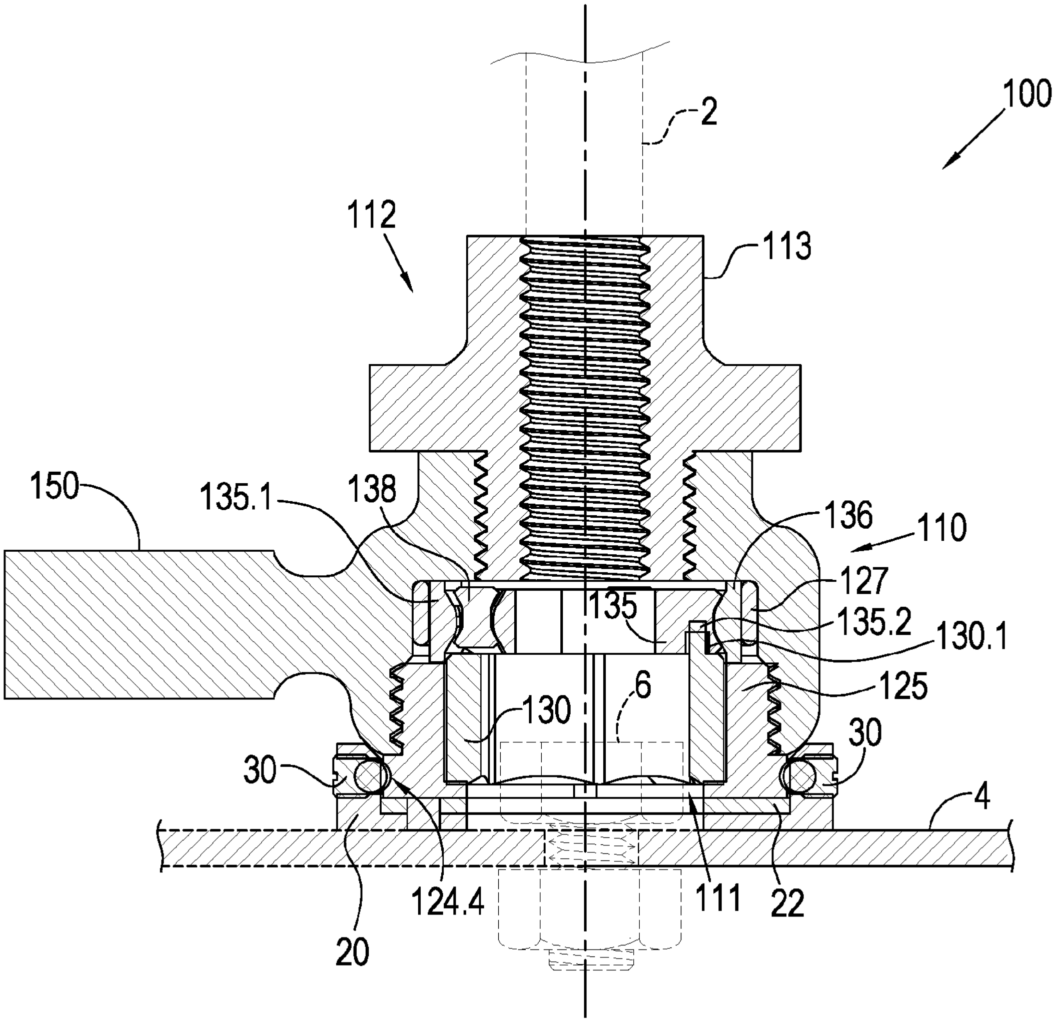
FIG. 9 shows a sectional side view of the system of FIG. 5 at F-F, in use, with an elongate member and nut included in dotted lines for illustrative purposes.

In assembly, referring to FIGS. 5 to 9, particularly FIGS. 7 and 8, of the drawings, the thrust washer 22 is attached to the base portion 20 in an immovable fashion via one or more pins 28 through aligned apertures provided on said components.

The friction bush 127 is press fitted into the seat provided in the chamber 134. The elements 138 are located in the portions 135.1 of the disk 135 and is located in the sleeve 136. To this end, the sleeve may be in a two-piece construction to facilitate ease of construction. The assembly 132 is then located within the bush 127 such that they are co-axially arranged.

The nut engaging socket 130 is located in a cradle defined by the retaining member 125 and the member 125 is screwed into place in the body 124 such that the male castellations 130.1 are brought into location with the grooves 135.2. the nut engaging socket 130 has an end opposite the castellations 130.1 which is shaped and/or dimensioned for operative engagement with the nut 6.

The retaining member 125 is attached to the base portion 20 such that the surface 124.3 of the member 125 rests on and effectively abuts the thrust washer 22, and the ball plungers 30 are operatively located in the groove 124.4. In this way, the body 124, as well as the arrangement 126 located in the chamber 134, are restrained from displacement, and thus disengagement from the base portion 20, in the axial direction A with at least the body 24 being free to rotate in the transverse directions D & E. It will be appreciated that the mating surfaces between the member 125 and the thrust washer 22 may be lubricated via a suitable lubricant prior to assembly as described herein.

In use, referring again to FIGS. 5 to 9 of the drawings, the operation of the system 100 is identical to the operation of the system 8. In particular, when tensioning a bolt 2 with a nut 6 operatively attached adjacent an interface of the same with the object 4, a portion of threaded portion of the bolt/stud 2 protrudes from the nut 6 in a similar fashion as described herein.

The tensioner device 100 is then located over the nut 6 and bolt/stud 2 such that the nut 6 and bolt/stud 2 is located through the central bore 111 of the device 110 with the base portion 20 resting on the object 4. In particular, an operative under surface of the base portion 20 rests on a surface of the object 4 surrounding the nut 6 and bolt/stud 2.

With the base portion 20 resting on the object, the nut engaging socket 130 operatively engages the outer lateral peripheries of the nut 6. A free end of the bolt 2 projects through the bore 131 of the body 124 for engagement with the anti-rotation member 112.

The anti-rotation member 112 is then brought into engagement and attached to both the device 110 and the bolt/stud 2. In particular, the member 112 is attached to the bolt 2 by simply locating a free end of the bolt 2 through the bore 118 of the member 112 and rotating the same relative to each other by way of the screw-threads 16.1 matched in a complementary fashion to screw threads 2.1 provided on an outer surface of the bolt 2.1. The member 112 is wound down on the bolt 2 till engagement of screw-threading provided on an outer surface of the member 112 with complementary screw-threading provided in an internal face of the body 124 defining the bore 131. The member 112 is wound down relative to the tensioning body 124 thereby to attach the member 112 to the body 124.

to the winding the member 112 down relative to the bolt/stud 2 and the body 124, typically in a clockwise fashion as can be seen in FIG. 6. The member 112 nests in a screw-threaded fashion in the bore 131 of the body 124. In this way the system 100 is operatively attached to the nut 6 and bolt 2.

In this regard, the turning of the body 124 causes axial stretch of the bolt/stud 2 and automatic and/or simultaneous tightening of the nut 6 with a torque value which is less than the torque applied to the body 124.

It will be noted that with a nut 6 operatively engaged by the socket 125, the bolt/stud 2 by the member 112, and the member 112 operatively located in the body 124, rotation of the tensioning body 124 in the direction of arrow D by way of a tension wrench attached to the member 150 and simultaneous application of a holding force either via a spanner on the nut 113, or by gripping by hand of the member 112, causes the body 124 to rotate under load relative to the base portion 20 and the thrust washer 22.

The greatest friction is encountered between abutting surfaces 22.1 and 124.3 in axially stretching the bolt/stud 2 as compared to nut 6 and bolt/stud 2 friction encountered between the nut 6 and bolt/stud 2. Rotation of the body 124 and the simultaneous application of the holding force on the member 112 causes the bolt/stud 2 to axially stretch in a desirable manner. The force or toque applied to bring about rotation of the body 124 may be selected so that it is sufficient to overcome the friction between the bush 127 and the sleeve 136 as well as cause desired axial stretch of the bolt/stud 2.

Moreover, as the body 124 rotates about the central axis X in the direction of arrow D with the force being applied via the handle/tension wrench (not shown) attached to the body 124, the socket 130, with the nut located therein, engages the clutch assembly 132. In particular, the castellations 130.1 or other suitable engaging formations of the socket 130 engage the clutch disk 135 or the grooves 135.2 with a slight degree of play before operating the clutch assembly 132 to the locked condition whilst force/torque is applied in the direction of arrow D on the body 124.

In the locked condition, the clutch disk 135 is locked against rotation within the sleeve 136 about its axis and thus assembly 132 rotates about its axis as a singular unit relative to the friction bush 127. The sleeve 136 moves relative to the friction bush whilst abutting said friction bush 127 during rotation of the tensioning body 124 in the direction of arrow D which causes the socket 130 to turn the nut with a reduced torque than the torque applied to the turn the body 124.

In this way, the bolt/stud 2 is axially stretched and the nut 6 is simultaneously and/or automatically turned about the axially stretched nut with a lower torque than the torque applied to the body 124. It will be noted that arrangement 126 turns the nut 6 with a lower torque which is derived from the torque applied to the tensioning body 124 to tension the bolt/stud 2.

Similarly as described herein, once desired bolt stretching has been achieved, the member 112 is removed from the bolt/stud 2 and the body 124 with its components are removed. The system 100 is also thus a removable system as opposed to more costly stay-on systems.

It will be noted that loosening of the nut/undoing the bolt/stud 2 stretch may be achieved with conventional tools such as hand wrenches.

The present invention provides a means to achieve bolt/stud stretching mechanically without the requirement of hydraulic, pneumatic, or electric power. Moreover, the present invention addresses the drawbacks of conventional torqueing techniques to axially stretch a bolt/stud, wherein the nut is merely used to preserve the desirable axial stretch of the bolt/stud achieved with the system as described herein. The present invention therefore provides a convenient and cost-effective manner in which best practices for bolt tightening is provided to industry and the general public.

The invention claimed is:

1. A removable mechanical tensioning system for stretching an elongate member in an axial direction, the elongate member being located in and attachable to an object via a nut, wherein the system comprises:

an anti-rotation member; and a tensioner device defining an interior within which the elongate member and nut are locatable, in use, wherein the anti-rotation member is removably attachable to the tensioner device and the elongate member, and wherein the tensioner device comprises or is operatively coupled to a nut engaging assembly configured to engage the nut, in use, such that displacement of at least a transversely displaceable part of the tensioner device in a transverse direction, transverse to the axial direction, with a holding force applied to the anti-rotation member to limit displacement of the anti-rotation member and the elongate member in the transverse direction, causes stretch of the elongate member in the axial direction and automatic actuation of the nut engaging assembly to bring about displacement of the nut in the transverse direction relative to the stretched elongate member with torque which is lower than torque applied to the bring about operative displacement of the transversely displaceable part of the tensioner device;

wherein the tensioner device has a central axis and comprises:

a base portion;

a friction element; and a tensioning body attached to the base portion while abutting the friction element, wherein the tensioning body is freely displaceable in the transverse direction relative to the base portion and the friction element in a frictional fashion, at least in use;

wherein the tensioning body is substantially cylindrical extending between first and second end portions along the central axis, wherein the first end portion of the tensioning body defines engaging formations within a bore thereof for engaging the anti-rotation member, in use, and wherein the tensioning body defines a chamber in the second end portion, wherein the chamber is in communication with the bore, wherein the tensioning body is attached to the base portion adjacent the second end portion thereof, and wherein the base portion defines an aperture aligned with the central axis for receiving the elongate member and nut, and locating the same operatively in the bore and chamber of the tensioning body, respectively.

2. A system as claimed in claim 1, wherein the nut engaging assembly is configured to displace the nut in the transverse direction automatically and/or simultaneously with stretching of the elongate member.

3. A system as claimed in claim 1, wherein the lower torque applied by the nut engaging assembly to bring about displacement of the nut is derived from the torque applied to displace the transversely displaceable part of the tensioner device in the transverse direction.

4. A system as claimed in claim 1, wherein the tensioning body is the transversely displaceable part of the tensioner device which is transversely displaceable, in use, in response to an applied torque, wherein the nut engaging assembly is automatically and/or simultaneously actuated as a result of operative cooperation between the nut engaging assembly and the tensioning body during displacement of the tensioning body, in use.

5. A system as claimed in claim 1, wherein the nut engaging assembly is operatively arranged with the base portion and/or the tensioning body such that, in use, with the elongate member with the nut attached located in a bore of the tensioner device, the nut engaging assembly operatively engages the nut such that with the anti-rotation member attached to both the tensioner device and the elongate member, and with a holding force which restricts displacement of the anti-rotation member and the elongate member in the transverse direction being applied to the anti-rotation member, displacement of the tensioning body in the transverse direction causes:

displacement of the anti-rotation member and stretch of the elongate member in the axial direction; and actuation of the nut engaging assembly to bring about automatic displacement of the nut in the transverse direction relative to the stretched elongate member.

6. A system as claimed in claim 1, wherein the friction element is, at least in part, sandwiched between the tensioning body and the base portion such that the second end portion of the tensioning body defines a surface which abuts the friction element when the tensioning body is attached to the base portion.

7. A system as claimed in claim 1, wherein the nut engaging assembly comprises a resilient nut engaging member adapted to engage the nut, in use, wherein the resilient nut engaging member co-operates with the displaceable part of the tensioner device during displacement thereof in the transverse direction to cause loading of the resilient nut engaging member which causes displacement of the nut with a lower torque than the torque applied to the transversely displaceable part of the tensioner device, in the transverse direction relative to the stretched elongate member upon release of said loading.

8. A system as claimed in claim 7, wherein the resilient nut engaging member is in the form of a resilient spring-like member extending between a first end portion and a second end portion, wherein the resilient nut engaging member has a bore provided therethrough.

9. A system as claimed in claim 7, wherein the resilient nut engaging member comprises a load release mechanism to release the loaded resilient nut engaging member causing displacement thereof thereby to displace the nut in the transverse direction, in use.

10. A system as claimed in claim 1, wherein the anti-rotation member comprises a handle portion and a cylindrical portion defining a bore therethrough, wherein the anti-rotation member comprises first engaging formations provided on an interior of the cylindrical portion for engagement with complementary engaging formations on an outer surface of the elongate member, and wherein the anti-rotation member comprises second engaging formations on an exterior of the cylindrical portion for engagement with complementary engaging formations on an interior of the transversely displaceable part of the tensioner device; and wherein the anti-rotation member comprises a tool engaging portion having a bore therethrough, and wherein the tool engaging portion comprises an integral nut engageable with a conventional torque wrench, in use.

11. A removable mechanical tensioning system for stretching an elongate member in an axial direction, the elongate member being located in and attachable to an object via a nut, wherein the system comprises:

an anti-rotation member; and a tensioner device defining an interior within which the elongate member and nut are locatable, in use, wherein the anti-rotation member is removably attachable to the tensioner device and the elongate member, and wherein the tensioner device comprises or is operatively coupled to a nut engaging assembly configured to engage the nut, in use, such that displacement of at least a transversely displaceable part of the tensioner device in a transverse direction, transverse to the axial direction, with a holding force applied to the anti-rotation member to limit displacement of the anti-rotation member and the elongate member in the transverse direction, causes stretch of the elongate member in the axial direction and automatic actuation of the nut engaging assembly to bring about displacement of the nut in the transverse direction relative to the stretched elongate member with torque which is lower than torque applied to the bring about operative displacement of the transversely displaceable part of the tensioner device, wherein the nut engaging assembly comprises a clutch arrangement configured to engage the nut and displace the nut in the transverse direction with a lower torque than the torque applied to the transversely displaceable part of the tensioner device.

12. A system as claimed in claim 11, wherein the clutch arrangement comprises:

a nut rotating socket; and a one way clutch assembly which interfaces with the friction element and co-operates with the nut rotating socket such that, in use, application of torque to bring about displacement of the displaceable part of the tensioner device in the transverse direction causes the one way clutch assembly to be operated to a locked condition in which it is frictionally displaceable relative to the friction element only so as to limit the torque applied to the nut located operatively in nut rotating socket to a lower value than that of the torque applied to the displaceable part of the tensioner device.

13. A system as claimed in claim 12, wherein displacement of the displaceable part of the tensioning device in a direction opposite to the transverse direction, in use, causes the one way clutch assembly to be operated to an activated condition which permits free displacement of the nut rotating socket and/or the displaceable part of the tensioning device relative to the clutch assembly.

14. A system as claimed in claim 13, wherein the one way clutch assembly comprises a clutch disk locatable in and displaceable within a sleeve, wherein the clutch disk comprises one or more peripheral apertures within which clutch elements are locatable, wherein the clutch elements facilitate operation of the one way clutch assembly between the locked and activated conditions, wherein in the locked condition the clutch disk is locked against displacement within the sleeve, and wherein in the activated condition the clutch disk is freely displaceable within the sleeve.

15. A method for stretching an elongate member in an axial direction mechanically, the elongate member being located in and attachable to an object via a nut, wherein the method comprises:

locating a tensioner device over the elongate member and the nut such that a base of the tensioner device rests on the object and a nut engaging assembly of or coupled to the tensioner device engages the nut;

attaching an anti-rotation member to the elongate member and the tensioner device;

applying a holding force to the anti-rotation member to restrict displacement of the anti-rotation member in a transverse direction which is transverse to the axial direction; and simultaneously when applying the holding force to the anti-rotation member, displacing a displaceable part of the tensioner device in the transverse direction, wherein the displacement of the displaceable part of the tensioner device in the transverse direction causes displacement of the anti-rotation member and stretch of the elongate member in the axial direction; and actuation of the nut engaging assembly to bring about automatic and/or simultaneous displacement of the nut in the transverse direction relative to the stretched elongate member.

16. A method as claimed in claim 15, wherein the method comprises:

locating the tensioner device over the elongate member and the nut such that a base of the tensioner device rests on the object and a resilient nut engaging member of the tensioner device engages the nut; and simultaneously when applying the holding force to the anti-rotation member, displacing a tensioning body of the tensioner device in the transverse direction, wherein the tensioning body is freely displaceable relative to the base and a friction element of the tensioner device, wherein displacement of the tensioning body in the transverse direction causes displacement of the anti-rotation member and stretch of the elongate member in the axial direction; and loading of the resilient nut engaging member to cause automatic and/or simultaneous displacement of the nut in the transverse direction thereby automatically and/or simultaneously turning the nut relative to the stretched elongate member.

17. A method as claimed in claim 15, wherein the method comprises:

locating the tensioner device over the elongate member and the nut such that a base of the tensioner device rests on the object and a clutch arrangement of the tensioner device engages the nut;

simultaneously when applying the holding force to the anti-rotation member, displacing a tensioning body of the tensioner device in the transverse direction, wherein the tensioning body is freely displaceable relative to the base and a friction element of the tensioner device, wherein displacement of the tensioning body in the transverse direction causes displacement of the anti-rotation member and stretch of the elongate member in the axial direction; and operation of the clutch arrangement to cause displacement of the nut in the transverse direction relative to the stretched elongate member; and wherein once a desired loading of the elongate member has been achieved, the method comprises removing the anti-rotation member and the tensioner device from engagement with the elongate member and nut.

* * * * *